United States Patent [19]
Ast

[11] Patent Number: 5,829,346
[45] Date of Patent: Nov. 3, 1998

[54] BALE TWINE TENSIONER

[76] Inventor: Gene Ast, 515 NW Cherry La., Madras, Oreg. 97441

[21] Appl. No.: 882,688

[22] Filed: Jun. 25, 1997

[51] Int. Cl.$^6$ .............................. B65B 13/22; B65B 13/26
[52] U.S. Cl. .............................. 100/19 R; 100/21; 289/2; 289/6
[58] Field of Search .................................. 100/17–24, 90, 100/232; 56/343; 289/2, 6

[56] References Cited

U.S. PATENT DOCUMENTS

| | | |
|---|---|---|
| 3,708,190 | 1/1973 | Beedy . |
| 3,802,334 | 4/1974 | Smith et al. . |
| 4,157,063 | 6/1979 | Minke . |
| 4,372,588 | 2/1983 | Vansteelant . |
| 4,506,920 | 3/1985 | Raussendorf et al. . |
| 5,058,495 | 10/1991 | Van Den Bossche et al. . |
| 5,347,920 | 9/1994 | Vansteelant et al. . |

Primary Examiner—Stephen F. Gerrity
Attorney, Agent, or Firm—Frank J. Dykas

[57] ABSTRACT

A baler of crop material which forms bales by encircling compressed crop material with twine. The twine is formed in loops around the bale and knotted. The baler includes a bale compression chamber into which successive charges of crop material are introduced, a plunger for reciprocating movement in the bale compression chamber which serves to compact the charges and advance the compacted charges towards an exit. It also includes a knotter for tying twine in a form stabilizing manner around successive increments of compacted material after they have been compacted to form bales. A knotter position adjuster changes the position of the knotter in order to accomplish adjustment of tension on the twine during compression and before knotting.

9 Claims, 5 Drawing Sheets

BALE TWINE TENSIONER

DESCRIPTION

Background of the Invention

1. Technical Field

The present invention generally relates to agricultural baling machinery, and more particularly to a hay baler with an adjustable twine tensioning device.

2. Background

U.S. Pat. No. 4,718,335, is a patent by the instant inventor which describes a method of recompressing bales of fibrous material, and is incorporated herein by reference. This baling method is utilized when hay which has been formed into rectangular bales is recompressed to form a more compact bale of hay for shipment. Hay is recompressed in the manner described in the '335 patent in order to save space when shipping.

One of the problems which the '335 patent overcame was the problem of how to use twine to hold recompressed hay bales together, rather than using other methods, such as hook and latch, wire twine, or steel bands. The method described in the '335 patent is to take a bale which has been compressed in the field and formed into a rectangular bale, remove the twine holding the bale together, and place this rectangular bale in a recompression chamber. A piston presses the rectangular bale into the recompression chamber where it is recompressed and its size is reduced about in half. Once the recompressed bale is in its final configuration, it is retied with twine to hold it in place. After the twine is tied, a second hydraulic piston moves the recompressed bale into a decompression chamber at a right angle to the recompression chamber, in which the recompressed bale is held for a period of time sufficient to allow the release of trapped gasses and allow the release of recoil in the compressed crop material. After this short period of time, the recompressed bale is pressed out of the decompression chamber and the recompression and rebaling process is complete.

One problem that can be encountered in this process is the breakage of twine due to an over-tensioning of the twine. Before the bale esters the recompression chamber, several strands of twine (extend from a knotter mechanism which is mounted on top of the recompression chamber to and through a knotter needle, which is in a resting position below the recompression chamber. As the bale to be recompressed enters the recompression chamber, it encounters the strands of twine which are arranged vertically in front of it. The bale to be recompressed is pressed into the vertical strands of twine and as the bale is pressed toward the rear of the recompression chamber, the bale forces the hanging strands of twine into loops of twine which surround the bale on three sides. One end of the twine, termed the bitter end, is held firmly in the knotter mechanism mounted above the baler. The other end of the twine passes through the eye of the knotting needle, and originates in a twine spool, and is allowed to feed out as the bale forms a loop in the twine. After the bale has been fully recompressed, the knotter needle moves from its resting position to its knotting position. In doing so it brings up the second end of the twine, which is captured by the knotting mechanism, formed into a knot with the bitter end of the twine, and cut off, leaving a new first end of the twine grasped in the knotting mechanism, and a new second end of the twine which passes through the eye of the knotting needle and extends from the spool. After the knot is tied and the twine is cut off, the knotting needle returns to its resting position to allow the entry of another bale in the compression unit. Sometimes during this process, excessive tension can be placed on the twine due to irregular bales or other factors. When this happens, the twine can be over-tensioned in the compression and the knotting process and can break. This can occur because the leading face of the bale starts out rounded in shape, but is pressed into a rectangular shape. Once the leading face of the bale presses the twine against the end wall of the compression chamber, the twine can't slide freely to relieve stresses, but is still forced into a rectangular shape around the compressed bale. When twine breaks, the recompressed bale which eventually exits from the decompression chamber is a defective bale and must be released by breaking the remaining twine loops and it must be passed through the process again. Although irregular bales entering into the recompression chamber are a main cause of broken twine, other causes also exist. What is needed is a way to decrease the number of twine loops which are broken during the recompression process.

Similar problems causing over tensioning of the twine and resultant twine breakage can be encountered in balers baling material for the first time, such as field balers.

Accordingly, it is an object of this invention to provide a mechanism which relieves the strain on the twine being knotted in order to reduce the number of twine loops which are broken in the baling process, be it recompression baler or regular baler.

Additional objects, advantages and novel features of the invention will be set forth in part in the description which follows, and in part will become apparent to those skilled in the art upon examination of the following, or may be learned by practice of the invention. The objects and advantages of the invention may be realized and attained by means of the instrumentalities and combinations particularly pointed out in the appended claims.

SUMMARY OF INVENTION

According to the present invention, the foregoing and other objects and advantages are obtained by a baler of material which forms bales by encircling compressed material with twine. The material can be any material which is baled, such as crop material, cardboard, fibrous material, or other material. The twine is formed in loops around the bale and knotted. The baler includes a bale compression chamber into which successive charges of material are introduced, a plunger means for reciprocating movement in the bale compression chamber which serves to compact the charges and advance the compacted charges towards an exit. It also includes a knotter means for tying twine in a form stabilizing manner around successive increments of compacted material after they have been compacted to form bales. It also includes a knotter means position adjuster for changing the position of the knotter means in order to accomplish adjustment of tension on the twine. By changing the position of the knotter means, the knotter means position adjuster decreases tension on the twine during compression and before the twine is knotted. The knotter means position adjuster moves the knotter means away from its knotting position and away from the pull of the twine and applies a variable force resistance to the twine tension as the twine is allowed to pull the knotter means toward its knotting position during the compression of baled material. After completing the compression of the bale and before the knot is tied in the twine, the knotter means is moved the rest of the way to its knotting position, further reducing twine tension. The knotter means position adjuster can comprise a hydraulic control system, a hydraulic cylinder with spring and cylinder rod, which extends and changes the position of the knotter means by the movement of the cylinder rod. By decreasing tension on the twine during compression and before the twine is knotted, the knotter means position adjuster reduces the amount of twine loops that are broken due to excessive tension on the twine.

In accordance with another aspect of the invention, the invention is a baler for recompressing bales of previously baled crop material which has a way to adjust the tension on the twine during compression and before it is knotted. This recompression baler includes a bale recompression chamber into which successive charges of crop material are introduced, a first plunger means for reciprocating movement in the bale recompression chamber to compact the charges of crop material and advance the compacted charges towards an exit. The baler also includes a knotter means for tying twine in a form stabilizing manner around successive increments of compacted crop material after they have been compacted to form recompressed bales. The baler also includes a knotter means position adjuster for changing the position of the knotter means to accomplish adjustment of tension on the twine. The baler also includes a second plunger means for reciprocating movement in the bale compression chamber to move the recompressed bale into a decompression chamber. It also includes a decompression chamber for holding the bale for a sufficient time to allow the escape of trapped air and for the crop material to lose resiliency. The knotter means position adjuster of this baler decreases tension on the twine during compression and before the twine is knotted. It does this by the use of a hydraulic cylinder, a spring, and a hydraulic control system which changes position of the knotter means. The twine tension is adjusted using a variable force resistance to the twine tension.

The baler of the invention thus decreases the amount of twine breakage on bales and recompressed bales by the use of a knotter means position adjuster, which changes the position of the knotter means during compression and before the knot is tied in the twine. By this decrease in pressure on the twine before the knot is tied, fewer twine loops break, and fewer hay bales are thus defective.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the intention is capable of modification in various obvious respects all without departing from the invention. Accordingly, the drawings and description are to be regarded as illustrative in nature, and not as restrictive.

BEST MODE FOR CARRYING OUT INVENTION

Figure 1:
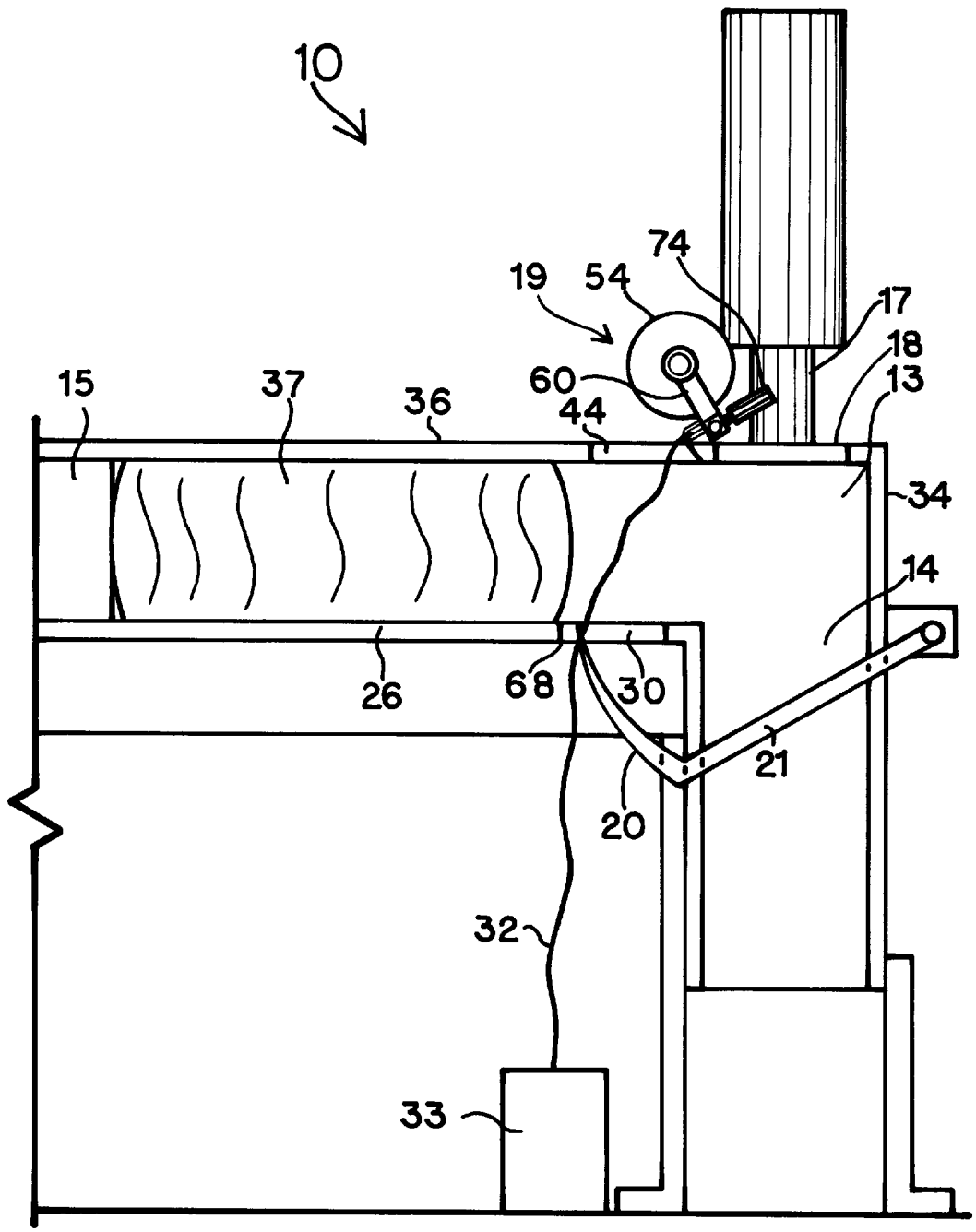
FIG. 1 is a side cross-sectional view of a recompression baler.
Figure 2:
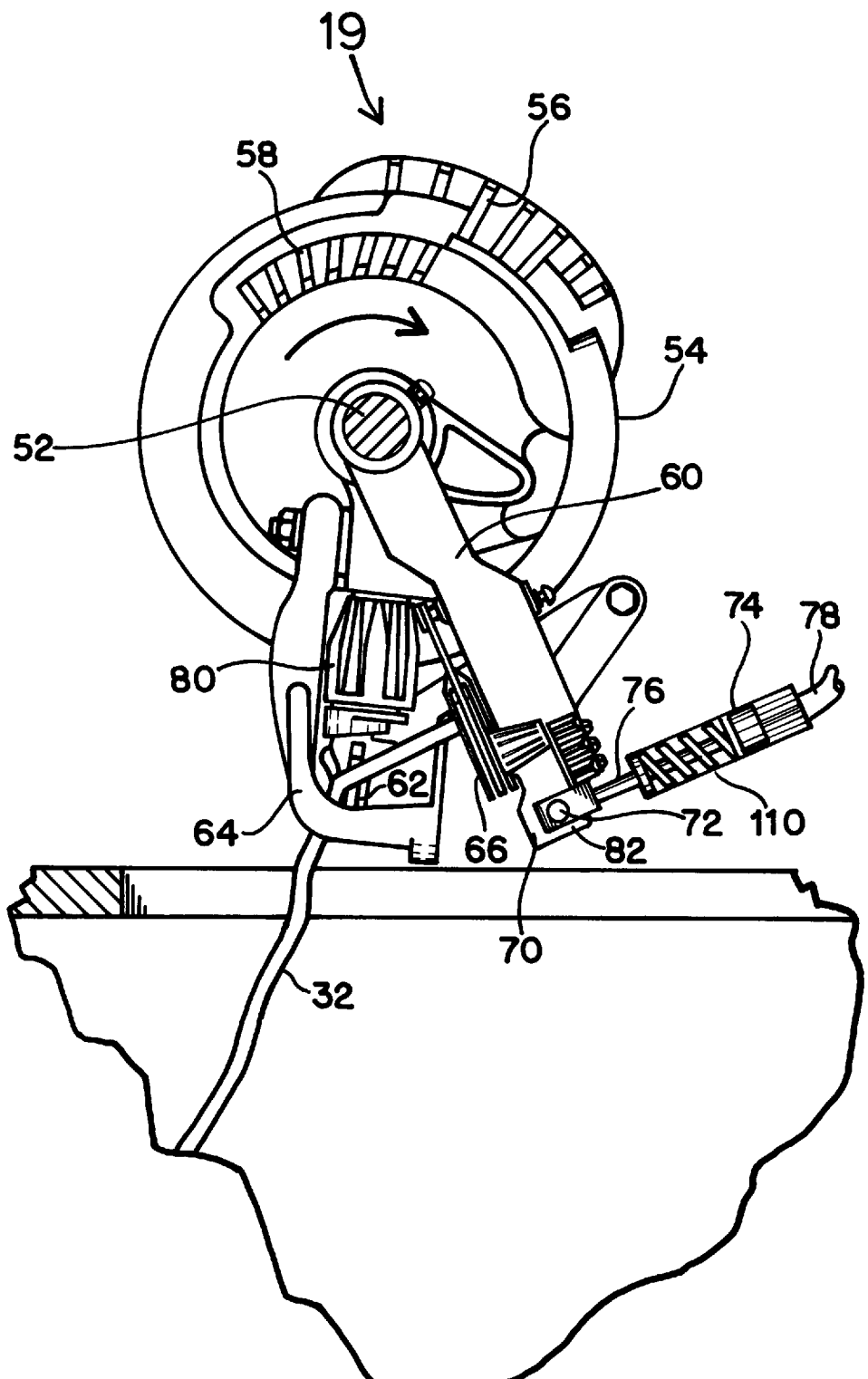
FIG. 2 is a side view of the knotter, twine and recompression chamber with the cylinder rod 76 extended.
Figure 3:
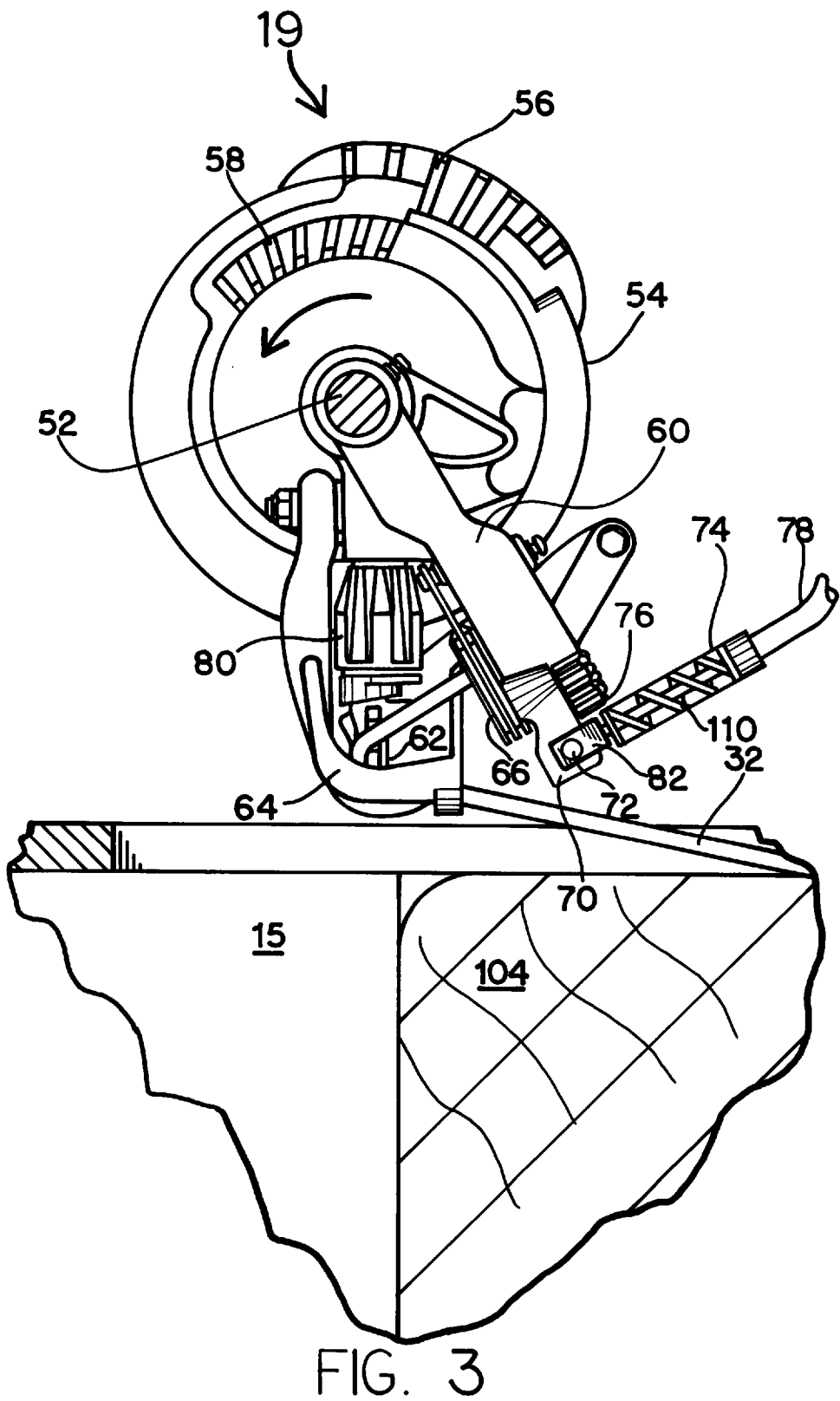
FIG. 3 is a side view of a knotter, twine, and a bale being recompressed in the recompression chamber, with the cylinder rod 76 retracted.
Figure 4:
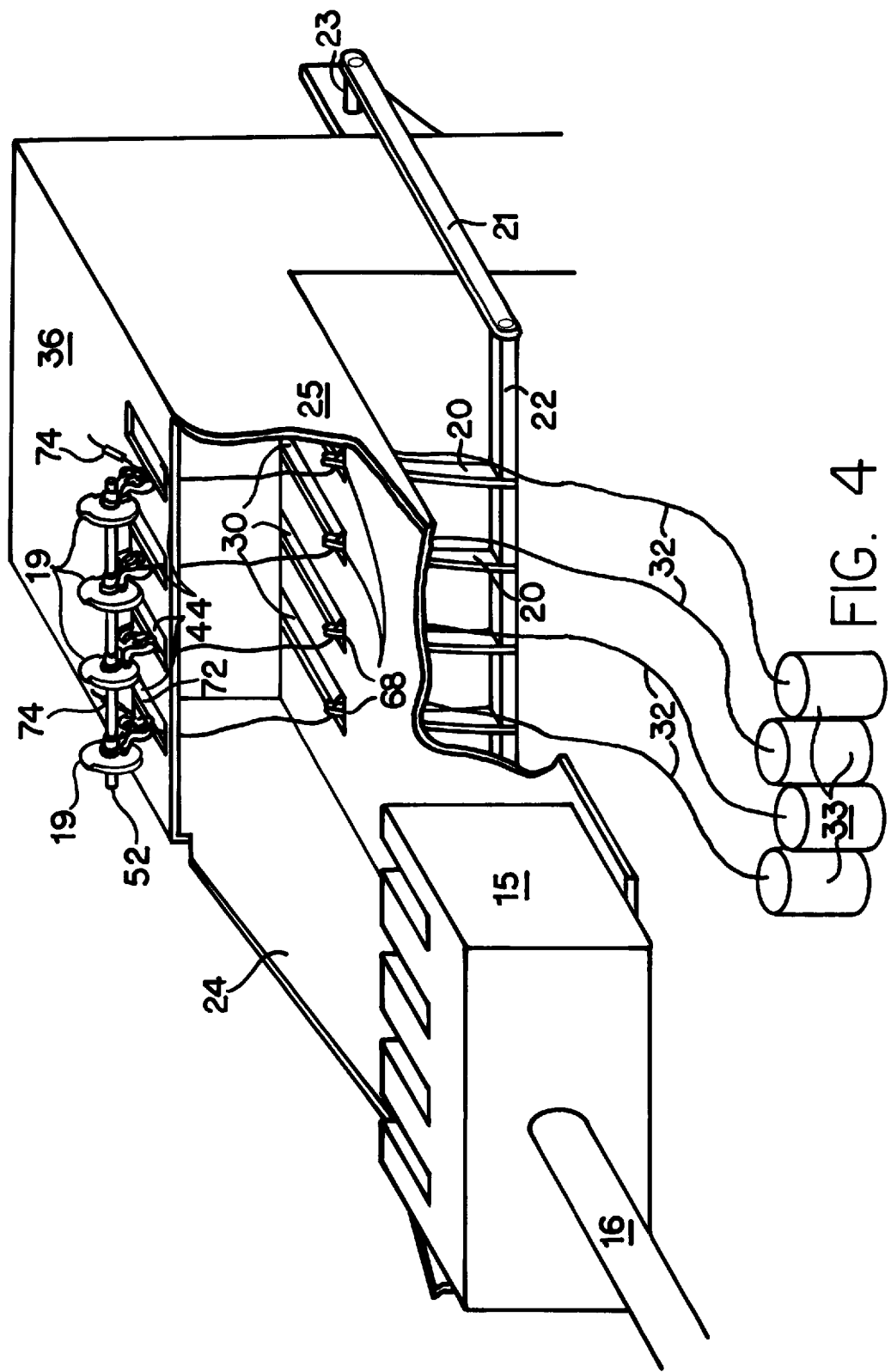
FIG. 4 is a perspective view showing four knotters on a shaft above a recompression chamber.

Referring to FIGS. 1–6, the invention is shown to advantage. The preferred embodiment of the invention is used on a baler of the type described in U.S. Pat. No. 4,718,335, incorporated herein by reference. The type of baler described in U.S. Pat. No. 4,718,335 is a baler which utilizes previously baled rectangular bales of hay, and which further recompresses those bales into a more compact version. As the previously baled hay enters the baler 10, the twine with which it was originally baled is removed. During the recompression and rebaling process, new twine is put around the recompressed bale. The baler includes a recompression platen 15 and a recompression ram 16, as shown in FIG. 4, which pushes a field bale 37 into a recompression chamber 13. The bale first passes across a bottom slide plate 26, as shown in FIG. 1. Bottom slide plate 26 is attached to side plates 24 and 25, to form a rectangular channel. Above the bottom slide plate 26 is recompression chamber 13. Recompression chamber 13 is generally rectangular and is formed preferably of steel plate. Recompression chamber 13 is not fully surrounded by steel plate walls, but on its bottom side is in open communication with decompression chamber 14. Decompression chamber 14 is a rectangular channel surrounded by steel plate walls which is open at one end to recompression chamber 13 and open at the opposite end to a low a recompressed bale to exit. Baler 10 also has twine needles 20 with a twine needle eye 68 through which twine 32 extends. Twine 32 originates in a coil in twine spool 33 and extends through twine needle eye 68 to twine holder 66, which is a part of knotter 19. This configuration is shown in FIGS. 1 through 4. Baler 10 also includes an ejection ram 17 and ejection platen 18 which is located on the top side of compression chamber 13. Ejection ram 17 forms part of the top wall of compression chamber 13.

Knotter 19 is shown in more detail in FIGS. 2 and 3. Knotter 19 includes a generally circular knotter drive wheel 54. On knotter drive wheel 54 are mounted first drive gears 56 and second drive gears 58. Knotter drive wheel 54 is mounted on knotter shaft 52, as shown in FIGS. 2, 3 and 4. Also mounted on knotter shaft 52 is knotter frame 60. Attached to knotter frame 60 are other components of the knotter 19, including bill hook 62, twine guiding member 64, twine holder 66 and bill hook gear 80. The knotter frame 60 has two ends, and one of its ends is mounted on knotter shaft 52. At the other end of knotter frame 60 is knotter bottom bracket 70, best shown in FIG. 2. Knotter bottom bracket 70 defines an orifice through which bottom bracket shaft 72 extends. As shown in FIG. 4, bottom bracket shaft 72 extends through the knotter bottom bracket 70 of all of the knotters 19 which are used on a particular baler 10. Attached to bottom bracket shaft 72 is rod bracket 82 of positioning cylinder 74, shown in FIG. 2. Rod bracket 82 is attached to bottom bracket shift 72 and positioning cylinder rod 76, which extends from positioning cylinder 74. Positioning cylinder 74, positioning cylinder rod 76, rod bracket 82 and control system 84 comprise the knotter means position adjuster 106, shown in FIGS. 5 and 6. Inside positioning cylinder 74 is return spring 110. Hydraulic line 78 connects the positioning cylinder 74 to the control system 84. These details of the knotter and the knotter means position adjuster 106 are shown in FIGS. 2 and 3.

Associated with the knotter means position adjuster 106 is a control system 84. Included in the control system 84 is a pressure reducing valve 86, with a pressure gauge 94, a pressure reducing drain line 90, and a pressure adjuster 96.

The control system 84 also includes a two position solenoid valve 88. These two valves are connected by hydraulic lines 92 and one hydraulic line 78 extends to each of two positioning cylinders 74.

The control system 84 also includes a hydraulic pump 98 and a hydraulic fluid sump 100, and hydraulic fluid 108.

In operation, a cycle of bale compression using a baler with a twine tensioning device begins by moving a field bale 37 into position on bottom slide plate 26, as shown in FIG. 1. Recompression ram 16 and recompression platen 15 then push field bale 37 into recompression chamber 13. In the process of being pushed into recompression chamber 13, field bale 37 intercepts four strings of bale twine 32, which originate from four twine spools 33. The four strings of bale twine 32 are threaded through twine needle eyes 68 and are attached to knotters 19. When the front of field bale 37 reaches end wall 34 of recompression chamber 13, it has wrapped four loops of bale twine 32 around the bottom, front and top of the field bale 37. As the bale is compressed, the twine is pinned between the bale 37 and end wall 34. At that point, considerable tension increases on bale twine 32 between the twine holder 66 and end wall 34. This twine tension combines with the force of return spring 110 which is pressing the positioning cylinder rod 76 to retract it into the positioning cylinder 74, and forces hydraulic oil out of the two positioning cylinders 74, allowing knotter frame 60 to begin rotating toward the knotting position shown in FIG. 6.

This action is variable in resistance, with adjustment of the pressure adjuster 96 and since the force applied by return spring 110 decreases as positioning cylinder rod 76 is retracted further into positioning cylinder 74. This retracting of cylinder rod 76 prevents the twine tension from going too high.

Figure 6:
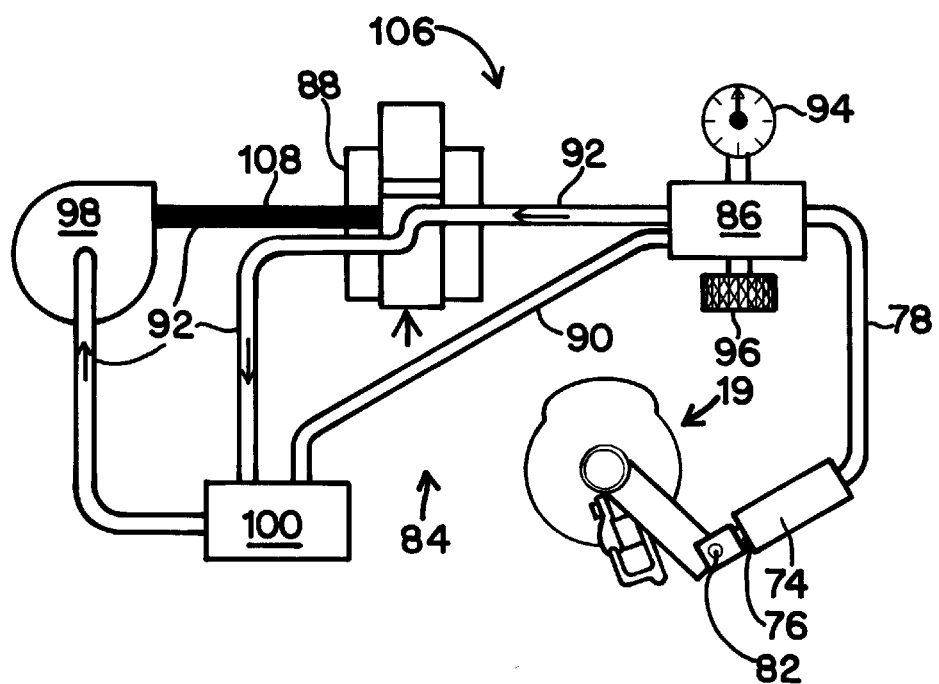
FIG. 6 is a diagram of the control system of the knotter position adjuster in its knotting position.

At the moment of maximum bale recompression and maximum twine tension, the two position solenoid valve 88 closes, and cuts off the positioning cylinder 74 from further hydraulic pressure and allows hydraulic fluid to drain from hydraulic lines 78 and 92 and from positioning cylinder 74, and reduces hydraulic pressure to zero from the normal 700 pounds. This configuration of the control system 84 is called the knotting position, because it occurs immediately prior to a knot being formed. The control system in the knotting position is shown in FIG. 6, in which the shaded hydraulic line indicates a pressurized line. This relief of pressure to zero on the hydraulic fluid in positioning cylinders 74 allows positioning cylinder rods 76 to be pressed the rest of the way (approximately ¼ inch) into positioning cylinders 74 by the return spring 110 and the rotation of knotter frame 60 around knotter shaft 52. The total movement amounts to about one and one-half to two inches of movement of the knotter bottom bracket 70. This rotation of the knotter 19 around knotter shaft 52 causes the position of twine holder 66, as well as the other knotter parts, to move slightly in relation to the recompressed bale 104. This movement causes a decrease in tension on the bale twine 32 during compression and prior to knotting. Immediately after this rotation of the knotter 19 around knotter shaft 52, twine needles 20 move from their position below the bale through slots 30 in bottom slide plate 26 and through needle openings 44 in top plate 36. Needles 20 in the process of moving upward through slots 30 and bottom slide plate 26, carry with them bale twine 32.

When needles 20 are fully extended, they engage knotters 19 which operate to tie knots in the loop of twine which has been wrapped around the recompressed bale, to cut the twine, and to retain the bitter end of the cut twine 32 which is threaded in the twine holder 66. Tying the twine 32 after tension on the twine has been relieved results in fewer twine breakage due to over-tensioned twine.

Figure 5:
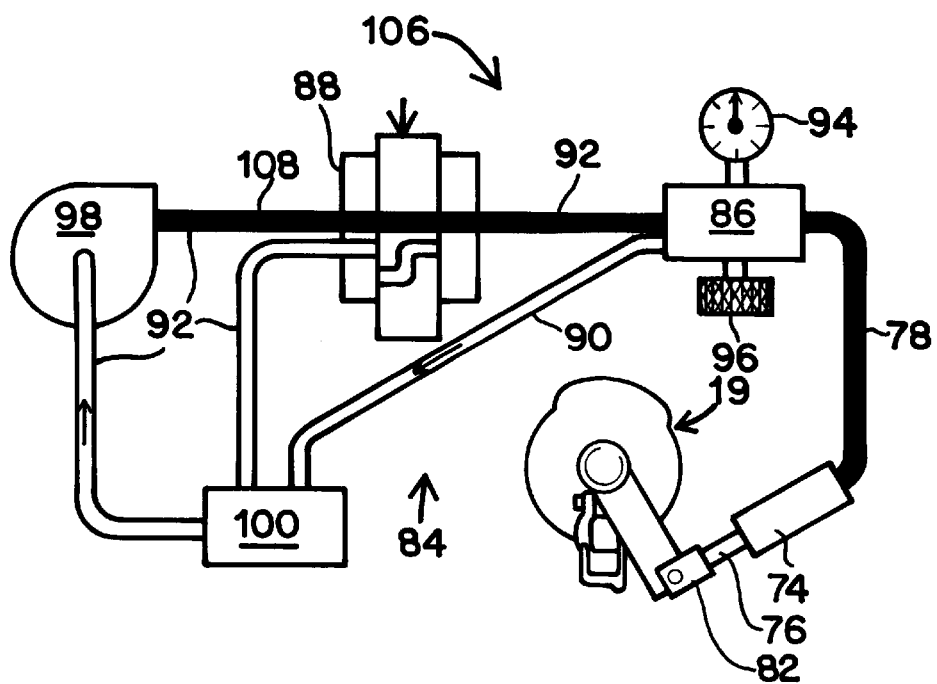
FIG. 5 is a diagram of the control system of the knotter position adjuster in its non-knotting position.

Once bale 37 has been recompressed and tied into recompressed bale 104, and the twine 32 cut, with the bitter end retained by knotters 19 and the needles 20 withdrawn, the two position solenoid valve 88 returns pressure to the pressure reducing valve 86 and the positioning cylinders 74. This configuration of the control system is called the compression position, because the control system is in this configuration during the compression stroke of the recompression ram 16. The compression position is shown in FIG. 5, with the shaded areas representing pressurized hydraulic lines. This configuration allows hydraulic fluid under pressure to travel through hydraulic lines 92 and 78 to pressurize positioning cylinders 74. When positioning cylinders 74 are pressurized, positioning cylinder rods 76 are extended outward under pressure, compress return springs 110, and exert pressure on bottom bracket shaft 72, which moves all of the knotters 19 away from positioning cylinders 74, back to their pre-knotting position.

While there is shown and described the present preferred embodiment of the invention, it is to be distinctly understood that this invention is not limited thereto but may be variously embodied to practice within the scope of the following claims.

I claim:

1. A baler of material which forms bales by encircling compressed material with twine which is knotted, comprising:
    a bale compression chamber into which successive charges of material are introduced;
    a plunger means for reciprocating movement in said bale compression chamber to thereby compact said charges and advance said compacted charges toward an exit;
    a knotter means for tying twine in a form stabilizing manner around successive increments of compacted material after they have been compacted to form bales; and
    a knotter means position adjuster for changing the position of the knotter means for adjustment of tension on the twine.

2. The baler of claim 1 in which said knotter means position adjuster decreases tension on said twine during compression and before said twine is knotted.

3. The baler of claim 2 in which said knotter means position adjuster is a variable force resistance to said twine tension.

4. The baler of claim 3 in which said knotter means position adjuster is a hydraulic cylinder, with a spring and a hydraulic control system.

5. A baler of crop material which forms bales by encircling compressed crop material with twine which is knotted, comprising:
    a bale recompression chamber into which successive charges of previously baled crop material are introduced;
    a first plunger means for reciprocating movement in said bale recompression chamber to thereby compact said charges and advance said compacted charges toward an exit;
    a knotter means for tying twine in a form stabilizing manner around successive increments of compacted crop material after they have been compacted to form bales;

a knotter means position adjuster for changing the position of the knotter means for adjustment of tension on the twine;

a second plunger means for reciprocating movement in said bale recompression chamber to move said bale into a decompression chamber; and a bale decompression chamber for holding said bale for a sufficient time to allow for the escape of trapped air and for the crop material to lose resiliency.

6. The baler of claim 5 in which said knotter means position adjuster decreases tension on said twine during recompression and before said twine is knotted.

7. The baler of claim 6 in which said knotter means position adjuster is a variable force resistance to said twine tension.

8. The baler of claim 7 in which said knotter means position adjuster is a hydraulic cylinder, with a spring and a hydraulic control system.

9. A baler of crop material which forms bales by encircling compressed crop material with twine which is knotted, comprising:

a bale recompression chamber into which successive charges of previously baled crop material are introduced;

a first plunger means for reciprocating movement in said bale recompression chamber to thereby compact said charges and advance said compacted charges toward an exit;

a knotter means for tying twine in a form stabilizing manner around successive increments of compacted crop material after they have been compacted to form bales;

a hydraulic cylinder, with a spring and a hydraulic control system which acts as a knotter means position adjuster for changing the position of the knotter means for variable adjustment of tension on the twine during compression and before said twine is knotted;

a second plunger means for reciprocating movement in said bale recompression chamber to move said bale into a decompression chamber; and a bale decompression chamber for holding said bale for a sufficient time to allow for the escape of trapped air and for the crop material to lose resiliency.

\* \* \* \* \*